Jan. 3, 1967     W. T. KNAUTH     3,296,515

DIMINISHING RATE BATTERY CHARGER

Filed May 5, 1964

INVENTOR

WALTER T. KNAUTH

United States Patent Office 3,296,515
Patented Jan. 3, 1967

3,296,515
DIMINISHING RATE BATTERY CHARGER
Walter T. Knauth, 1334 W. Gray, Houston, Tex. 77019
Filed May 5, 1964, Ser. No. 365,058
6 Claims. (Cl. 320—24)

This invention relates to battery chargers, and in particular to a battery charger of special controls and equipped with special safeguards, thereby enabling it to render complete, accurate and full service under the varying exactments of charging batteries over a wide range of safety exactments.

The battery charger constituting this invention is adapted differently than conventional battery chargers in that it can charge a battery at a rate proportionate to the amount the battery potential has fallen below its normal full charge potential, the amount or quantity of charge being predicated on the ampere-hour capacity of that particular battery which is to receive charge. Also, the battery charger is adapted to cut off as the battery being charged reaches full charge and to do this regardless of normal power line voltage fluctuations. Also, the battery charger of this invention is protected against overload current surges due to the short circuiting of serviced battery leads; due to reversed polarity hook-ups; due to connection of the charger to a battery of a nominal voltage rating other than that for which the charger is designed; or due to connection of the charger to an inferior battery, such as one with deteriorated cells or with shorted separator plates. In addition, the battery charger is protected against overload surges due to the application of an excessive external load, such as the excessive load of a motor starter being placed upon a serviced battery while it is connected to the battery charger.

Also, the battery charger includes a temperature sensing device which adapts it to cut off responsive to overheat as a result of its attempted misuse simultaneously as a battery charger and a power supply, as when external intermediate loads are applied to the battery being serviced. For example, automobile headlights, cigarette lighters, fan circuits, and the like, upon removal of external intermediate load, the temperature sensing device reacts to start the battery charger back in normal service.

The battery charger comprising this invention offers other advantage in that it includes a built-in means whereby a completely discharged battery can be checked as to its condition or ability, within practical limits, to receive, and subsequently to deliver, a normal charge of energy.

Also, by employing the above described protective features, the invention is further enabled to use lower power loss semi-conductors such as the recently developed controlled rectifier type and, as such, these conductors can be totally enclosed and incapsulated as for safety, protection against deterioration in weather, to prevent tampering and for other protective advantages.

With the foregoing premises to be considered, the invention may be stated to offer a succession of substantially equally important objects, expressly:

(1) To provide a battery charger which can charge a battery at a rate commensurate to the amount of charge below normal;

(2) To provide a battery charger which can charge a battery in amount predicated upon its relative ampere-hour capacity to take charge;

(3) To provide a battery charger adapted to cut off as a battery under service approximates full charge voltage;

(4) To make such cut-off at its full charge voltage regardless of normal power line voltage fluctuations;

(5) To provide a battery charger which is protected against overload current surges resulting from:
 (a) short circuiting of serviced battery leads;
 (b) reversed polarity hook-ups;
 (c) connection of the battery charger to a battery having a nominal voltage rating other than that for which the charger is designed;
 (d) connection to an inferior battery, as of deteriorated cells or with shorted separator plates; and
 (e) an excessive external load, as the load of a motor being placed upon a battery while being serviced by the charger;

(6) To provide a battery charger equipped with a temperature sensing device to protect against overheating;

(7) To provide a battery charger equipped with a built-in inspection means to determine the ability of the battery to receive, and subsequently deliver, a normal charge of energy; and (8) To provide a battery charger permitting the use of low power loss conductors adapted to be totally enclosed and incapsulated.

Other and further objects will be apparent when the specification herein is considered in connection with the drawings, in which.

Figure 1:
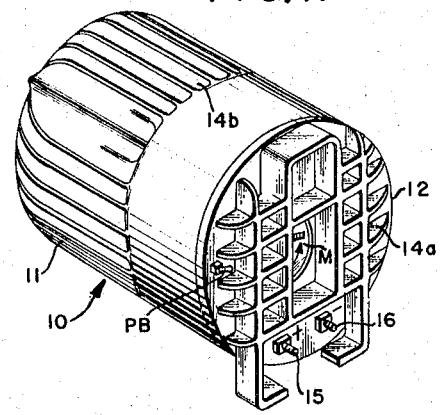
FIG. 1 is an isometric view of the housing or enclosing hull in which the invention is incapsulated.

Referring now to the drawings, the housing 10, shown in FIG. 1, includes a base or transformer housing 11 and a cap or charging apparatus housing 12. The cap 12 may be assembled to the transformer housing 11 by means of an epoxy resin painted on the rim of the transformer housing and the peripheral surface of the flat, inner face of the cap, as indicated at 13 in FIG. 2.

With such an assembly, only the outer ends or terminals 15, 16 of the battery posts extend outwardly of the cap 12 sufficiently for a battery to be connected thereto without interference with the radiation fins 14a provided on the cap outer surface for the dissipation of heat, fins 14b for a similar purpose being formed in the outer surface of the housing 11. The reference numeral 15 designates the positive battery connection post or terminal, and the reference numeral 16 designates the negative battery connection post or terminal.

Figure 3:
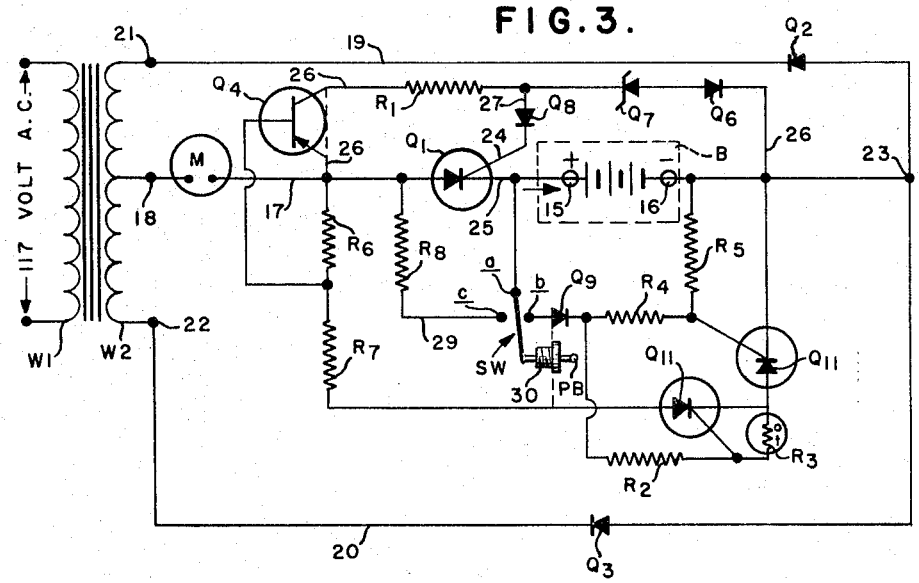
FIG. 3 is an electrical diagram of the invention.

The apparatus within the battery charger 10 is shown in diagrammatic form in FIG. 3, the primary transformer winding $W_1$ being indicated as having its opposed ends connected across a source of alternating current of say 60 cycle, 110–130 volt rating. The step-down or secondary winding $W_2$ has one end of a main circuit conductor 17 connected to its center tap 18, with a first return circuit conductor 19 connected to one extremity of the secondary at 21, and with a second return circuit conductor 20 connected to the other extremity of the secondary at 22.

The main circuit has connected in series thereinto successively from its center tap 18, first, an ammeter M and next a controlled power rectifier $Q_1$, followed by the positive battery connection post 15, from which the main circuit is continued through the battery to be charged to the negative battery conection post 16, the main circuit conductor 17 terminating at a return junction 23. From the return junction 23, the first and second return circuit conductors 19 and 20, return to the aforesaid secondary winding extremities 21 and 22, respectively, with the first circuit conductors 19 and 20, having respectively therein the power diodes $Q_2$ and $Q_3$ for full wave rectification.

The controlled rectifier is made conductive in a forward direction, as indicated by the arrow in FIG. 3, to pass through positive current to charge a battery B with respective positive and negative terminals connected into the main circuit conductor 17, by means of a gate 24 which is set positive with relation to the cathode 25. The process of making a controlled rectifier conductive, as hereinabove described, is commonly called, and will be hereinbelow referred to as "gate firing."

As shown in FIG. 3, the circuitry providing the gate firing potential includes a circuit 26 having successively therein, beginning at a junction with the main circuit 17, first a switching transistor $Q_4$, a current limiting resistance $R_1$, a zener diode $Q_7$, and a blocking diode $Q_6$, with the circuit 26 terminating at the junction 23. Also, a blocking diode $Q_8$ is included in a circuit 27 from a junction between limiting resistance $R_1$ and the positive side of the zener diode $Q_7$, and the gate terminal of the controlled rectifier $Q_1$.

The zener diode $Q_7$ is selected having a reverse breakdown voltage rating slightly higher than that of the full charge battery rating of the batteries to be charged and the gate 24 of the controlled rectifier $Q_1$ is connected by means of the aforesaid circuit 27 through the blocking diode $Q_8$ to the base or positive terminal of the selected zener diode $Q_7$. From the zener diode $Q_7$ return circuit is made from the negative terminal of the zener diode $Q_7$ by way of the blocking diode $Q_6$ in the circuit 26, to the main circuit 17, and the battery negative terminal 16, the battery B to be charged, and the battery positive terminal 15, to the cathode 25 of the controlled rectifier $Q_1$.

Thus, the initial mean effective gate firing potential with gate 24 positive and cathode 25 negative will be the rated zener voltage less the actual voltage of the battery B as it is hooked between the terminals 15, 16. As the battery is charged, the rate of charging is automatically regulated in proportion to the instantaneous mean effective voltage difference between rated zener voltage and the voltage to which the battery has been charged at such instant.

In effect, the charge rate is regulated and constantly reduced as the battery approaches its full charge potential. Finally, the difference between the rated zener potential and the actual charge potential attained by the battery is diminished to such a minimum that the battery may be accepted as fully charged. Or, with this type of battery charger, a battery may be left hooked up indefinitely subject to a maintenance or trickle charge.

The blocking diodes $Q_6$ and $Q_8$, and the switching transistor $Q_4$, which switches on the circuit 26, may be omitted, as indicated in FIG. 3 by dotted lines between emitter and collector of the transistor $Q_4$, and satisfactory performance obtained in automatically controlling the rate of charge hereinabove described. However, semi-conductors, such as the power diode rectifiers $Q_2$ and $Q_3$, and especially the controlled rectifier $Q_1$, are extremely susceptible to permanent damage if subjected to a power overload for even a period of a few micro-seconds, such as might occur, for example, if the battery under charge is hooked up improperly. Consequently, the provision of the switching transistor $Q_4$ and the blocking diodes $Q_6$ and $Q_8$, are safeguards, which cooperate with other components, some to be hereinbelow described, to prevent damage to the aforesaid rectifiers $Q_1$, $Q_2$ and $Q_3$.

Since a battery does not reach its maximum fully charged potential until it attains its full ampere-hour capacity to which it is rated, or is capable of receiving while under charge, it follows that the battery charger charges a battery in amount predicated upon its relative ampere-hour capacity to take charge.

As the rate of charging decreases as the battery potential is increased, the point of practical cut-off has to be reached as the point of practical full charge is reached, because the difference between the zener voltage and the battery charge capacity diminishes to a trickle charge or de minimis.

Since normal power line fluctuations do not affect selected zener voltage, and since zener voltage and charge on battery affect rate of charge, it follows that normal power line fluctuations have no effect on the rate of battery charging.

In order to provide a battery charger calculated to stand up with durability and dependability under continuous service, it was found necessary to equip such battery charger with certain items or elements of apparatus carrying out preventive functions in case of misuse and overload resulting therefrom. In this regard, all conceivable adverse connections that might be applied, either willfully or accidentally, to the exposed positive and negative terminals of a battery charger, were considered. As a first step, the elements to which adverse connection might be made were reduced or eliminated by incapsulating all components with only the terminals being exposed as shown by the threaded terminal ends 15, 16, shown extending outwardly from the cap 12 in FIG. 1.

Referring to FIG. 3, the battery charger 10 protective devices can be best described by considering all conceivable adverse connections that could willfully or accidentally be applied to the terminals "Pos." and "Neg." while the charger is connected to the power supply line.

If a battery having a nominal voltage equal to that for which the charger is designed is properly connected (with battery positive to terminal positive and battery negative to terminal negative) an overload protective device senses that such is a proper arrangement and proceeds to turn on the battery charger in the following manner:

A small current flows from the positive of the battery through a single pole double throw push button switch SW which remains normally closed on terminals *a* and *b*; a blocking diode $Q_9$; a resistance $R_4$, and back to the negative of the battery through the shunt resistor $R_5$. This current supplies the necessary potential to gate fire the small controlled rectifier $Q_{10}$; thus, making the anode to cathode path of $Q_{10}$ conductive so that the rectified D.C. potential existing between the center tap 18 and the junction point 23 may energize two series connected resistors $R_6$ and $R_7$ through controlled rectifier $Q_{11}$ (which is normally gate fired or conductive anode to cathode) and said $Q_{10}$. These resistors $R_6$ and $R_7$ when energized are employed as a voltage divider to supply turn-on base current to the switching transistor $Q_4$.

It is understood that a PNP (positive-negative-positive) switching transistor, as the transistor $Q_4$, is in an open state (non-conductive emitter to collector) with no base current, and is in a closed state (conductive emitter to collector) when base current is supplied. Therefore it follows that when proper battery connections are made, base current is supplied to the switching transistor $Q_4$ so that the emitter to collector becomes conductive whereby battery charging may proceed according to the automatic charge rate control previously described; and visually indicated by the ammeter M, the face of which extends outwardly in the cap 12.

If nothing is connected between the terminals 15, 16, no gate firing potential can be supplied to the controlled rectifier $Q_{10}$ so that the battery charger remains in the off position, as indicated by the ammeter M, and by the same token the charger remains cut off, and no gate firing potential is supplied to $Q_{10}$ even if the terminals were short circuited. For example, the metal shank of a screw driver could be placed across the terminals 15, 16, or battery lead clamps, or leads therefrom could be knocked together, and no overload damage can occur, as the battery charger remains off.

Furthermore, if the battery is connected to the charger in reverse manner (battery positive to terminal negative and battery negative to terminal positive) the charger remains cut off, because, in this case, the gate of $Q_{10}$ could only receive a reverse gate firing potential, and even this reverse potential could be prevented by the blocking diode $Q_9$.

The aforesaid protective means will function as described even if a battery having a higher or lower nominal voltage rating than that for which the charger is designed is applied in reverse manner to the terminals 15, 16.

It will also be noted that the blocking diode $Q_6$ in circuit 26, 27, protects the gate junction of controlled rectifier $Q_1$ from damage in case of the aforesaid reverse battery hook-ups.

In case of a battery of a designed lower voltage rating, or a battery of actual lower voltage (as due to defective cells) than that for which the battery charger is designed, is connected in proper manner to the battery charger, insufficient gate firing potential will be applied to the controlled rectifier $Q_{10}$, the battery charger will remain cut off and thereby will refuse to charge such battery.

Conversely, in case a battery of a higher voltage than that for which the battery charger is designed, is hooked up properly to the terminals 15, 16, the charger would likewise refuse to charge the battery (even though the battery voltage would gate fire the controlled rectifier $Q_{10}$), because the power or controlled rectifier $Q_1$ would not be turned on as a reverse bias would result at the gate 24, the voltage of the battery connected being greater than the selected zener voltage.

In case a battery of proper voltage rating, and properly hooked up to the battery charger, is under process of being charged, if a sudden heavy load, as a motor starter, is applied to the battery, the battery potential would be reduced below that necessary to gate fire the controlled rectifier $Q_{10}$, and consequently the battery charger will cut off and remain cut off until such heavy load is removed. Upon removal of the excess load, the potential of the battery under charge will return to normal, and the controlled rectifier $Q_{10}$ may gate fire to turn on the battery charger to resume normal operation.

Heretofore the controlled rectifier $Q_{11}$ has been described as being normally closed, and thus it served no more than a continuation part of the conductor between the resistance $R_7$ and the anode of the controlled rectifier $Q_{10}$. The controlled rectifier $Q_{11}$ is normally held closed, as aforesaid, by normally supplying gate firing potential from the battery B, through the SW contacts $a$ and $b$, the blocking diode $Q_9$, the series resistance $R_2$, the shunt thermistor resistance $R_3$, and back to the battery B through the controlled rectifier $Q_{10}$.

The thermistor $R_3$ is located physically as closely as possible, or in very close thermal relation, to the main circuit controlled rectifier $Q_1$ where the greatest amount of heat can be expected to occur if the battery charger 10 is overloaded. As it is an inherent characteristic of thermistors for their resistance to decrease in substantial proportion to an increase in ambient temperature, therefore, if a thermistor is selected having a proper nominal resistance rating in relation to the value of the resistance $R_2$, it follows that, at a predetermined temperature, the thermistor resistance value will be sufficiently reduced to shunt out the gate firing potential of the controlled rectifier $Q_{11}$. The controlled rectifier $Q_{11}$, as thus opened, de-energizes the resistances $R_6$ and $R_7$ to open the switching transistor $Q_4$, which in turn cuts off the charging current through the main circuit controlled rectifier $Q_1$. Thus, there is provided in the form of the resistance $R_2$, thermistor $R_3$, and controlled rectifier $Q_{11}$, a means to insure against the effects of overheating.

If a battery of correct nominal voltage rating is properly connected, and no charge current flow is indicated by the ammeter M, as can occur if such battery is so completely discharged that it has insufficient potential to gate fire the controlled rectifier $Q_{10}$, a built-in means of verification is provided. That is, a conventional push button PB, extending through a conventional mounting 30 in the cap 12, may be pushed to open contact between the switch points $a$ and $b$ and close contact between switch points $a$ and $c$. This renders inactive all components heretofore described as connected to the main charge circuit 17 and therefore the anode to cathode path through the main controlled rectifier $Q_1$ may be considered open.

However, a bridging circuit is thereby completed from the main circuit across the break at the controlled rectifier $Q_1$, and this bridging circuit 29 includes a current limiting resistor $R_8$, and the switch SW from $a$ through $c$. There results a limiting charge being imposed upon the battery as long as the push button PB is pressed to close contact between points $a$ and $c$.

To test the condition of the battery, the operator may press the push button PB and hold it in for a prescribed period of a few seconds and then release the push button. If the battery charger turns on, he may be reasonably certain that the battery was merely in a completely discharged condition. However, if upon releasing the push button the charger does not come on, the operator may suspect a poor condition in the battery. The test procedure may be repeated for progressively longer periods of forced charges and, if the charger repeatedly refuses to turn on, the battery has either a high internal or external leakage, deteriorated components, or one or more shorted cells. Also, the battery could have some degree of all three of the above listed conditions, or should be discarded rather than charged by this, or any other charger.

The automatic charge rate control previously described also may be used to check the condition of a battery by observing the ampere-hours of charging accepted by the battery before the automatic device reduces the charge rate to a mere trickle charge or, in effect, cuts off.

Conventionally, batteries are rated and labeled in terms of ampere-hours capacity. If a battery, known to be in a complete or near complete discharged state, is connected to the battery charger, the automatic device will proceed to allow a high rate of charge to enter the battery and if the battery charger continues to charge at a fairly high rate until the charger has supplied energy equal to, or nearly equal to the ampere-hour rating of the battery, before the charger automatically begins cutting back to a mere trickle, the battery may be considered in good condition. If, on the other hand, the charger begins to cut back the charge rate long before it has supplied energy equal to the ampere-hour rating of the battery, the battery may be considered incapable of receiving, storing and subsequently delivering the normal amount of energy for which the battery is designed.

Heretofore, high power loss conductors have been employed in battery chargers because they have been better known and available. Also, it has been possible to employ conventional equipment such as circuit breakers and fuses to protect such high power loss conductors, after a hazard, such as overload, has occurred. On the other hand, it has not been suggested to incapsulate such high power loss semi-conductors because of the excessive heat emanated thereby.

Although low power loss semi-conductors do not emanate excessive heat and thereby can be successfully incapsulated, the protective equipment for high power loss conductors, such as circuit breakers and fuses, which extend protection to them after a hazard occurs, such as overload, could not have been employed to protect low power loss semi-conductors, which are known to be so sensitive that they would burn out in a flash should a hazard, as overload, occur.

It follows that, with an adequate method of protecting low power loss semi-conductors, their use in battery chargers heretofore would have been preferable. This is true since they offer the added advantage of being adapted to be incapsulated. This invention, consequently, offers such protection to low power loss semi-conductors by employing them in a manner in which they are disposed with relation to each other to offer mutual protection against conditions arriving from which hazards may occur.

Since low power loss semi-conductors can be used when arranged according to this invention, the invention can also take advantage of their adaptability to be incapsulated, as they emanate very little heat.

Figure 2:
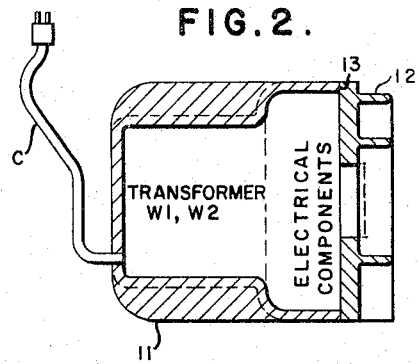
FIG. 2 is a longitudinal sectional elevation through the housing shown in FIG. 1.

As these semi-conductors can be incapsulated along with the conventional components combined therewith, to comprise this invention, all parts can thus be incapsulated so that, as shown in FIGS. 1 and 2, only the battery terminals 15, 16, the push button PB, the ammeter M, and the power lead-in cord C can be seen or physically contacted from the exterior of the battery charger. By incapsulation, protection is thus afforded to the delicate semi-conductors and other components against weather, tampering and accidental damage by extraneous contacts.

Since the gate potential necessary to gate fire controlled rectifiers, such as $Q_{10}$ and $Q_{11}$, varies inversely substantially linearly with ambient temperature, compensation for such variation may be obtained by employing a wire wound resistance $R_2$ in the case of $Q_{11}$, and $R_4$ in the case of $Q_{10}$, which exhibits a positive substantially linear temperature coefficient of resistance.

Figure 4:
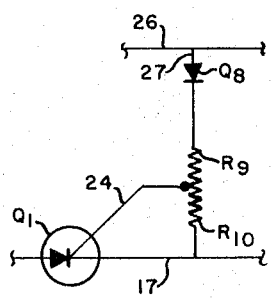
FIG. 4 is a fragmentary diagrammatic view of an alternative gate firing circuit.

For example, resistance wires comprised of 70% nickel and 30% iron will effect this compensation. FIG. 4 shows this principle applied to the gate firing circuit of controlled rectifier $Q_1$ by adding a voltage divider, as shown in FIG. 4, consisting of a resistance $R_9$ in circuit 24, and a resistance $R_{10}$, the resistance $R_9$ being comprised of a compensating alloy, such as 70% nickel and 30% iron, hereinabove described.

The use of such a voltage divider at this point makes it possible by varying these resistances to compensate for variations of characteristics of the other electrical components, one from another, when supplied in quantity production. This is obvious, since compensation for variation, when effected through the aforesaid resistances, permits a relaxation of tolerance requirement in the selection of the instant controlled rectifier and in other semi-conductors employed, such as the zener $Q_7$.

By way of elaboration on the drawings, and with special relationship to the elements indicated in FIG. 3, a battery charger for charging storage batteries of 12 volt rating could best have the hereinbelow listed elements constructed and comprised as follows:

*Data on elements in FIG. 3*

$W_1$—200 turns of #18 wire (wound on 8 pounds of laminated iron core).[1]
$W_2$—48 turns of #12 wire (wound on 8 pounds of laminated iron core).[1]
$Q_1$—Silicon control rectifier rated 25 to 30 amperes; 100 to 150 reverse voltage.
$Q_2$ and $Q_3$—Silicon power rectifiers each rated 15 to 20 amperes; 100 to 150 reverse voltage.
$Q_4$—Silicon or germanium PNP switching transistor, rating 7 to 8 watts; 3 amperes; 40 to 60 reverse voltage.
$Q_6$, $Q_8$, $Q_9$—Silicon diodes; rating ½ to 1 ampere; 100 to 150 reverse voltage.
$Q_7$—Zener diode; rating 15 to 16 volts; 3½ watts.
$Q_{10}$, $Q_{11}$—Silicon controlled rectifiers, rating each 1 ampere; 100 to 150 reverse voltage.
$R_1$—62 ohms, 2 watts.
$R_2$, $R_4$—Each 15,000 ohms, ¼ watt (70% nickel and 30% iron wire.
$R_3$—10,000 ohms (thermistor ratio 9.1) thermistor placed in close proximity to $Q_1$ for temperature sensing.
$R_5$—900 ohms, ¼ watt, carbon.
$R_6$—330 ohms, ½ watt, carbon.
$R_7$—1500 ohms, ½ watt, carbon.
$R_8$—50 ohms, 10 watt, wire wound.
SW—Single pole, double throw, push button, 3 ampere rating.
M—Ammeter, 20 amperes D.C.

[1] Same core.

The invention is not limited to the charted ratings of elements listed immediately hereinabove, nor to any exact combinations of components, nor to their sequence of arrangement nor to modifications, variations, and other embodiments and battery charger usages which may be employed; rather the invention includes all modifications, combinations, variations, embodiments and usages as long as such may fall within the broad spirit of the invention and within the broad scope of interpretation claimed for and merited by the appended claims.

What is claimed is:

1. In a battery charger, the combination of a transformer having a primary winding connected to a source of A.C. power and a center tapped, step-down, secondary winding, a main circuit having successively therein from said center tap, a controlled rectifier including a gate, positive and negative battery posts, and a return junction, said main circuit also including an ammeter therein, parallel return circuits, each including a return rectifier to return said charge current alternately each cycle from said return junction to a respective secondary winding extremely, a current limiting resistor, a zener, and a first battery current blocking diode successively in a series circuit between the center tap and said return junction and cooperative to establish a reference voltage, and a gate firing circuit connecting said series circuit, between said zener and said current limiting resistor, to said gate, said gate firing circuit including a second battery current blocking diode therein facing oppositely of said first blocking diode, and said gate firing circuit disposing said reference voltage for comparison with the actual battery voltage in opposing polarity whereby the difference between said voltages is employed to gate fire said controlled rectifier for charge current control whereby the diminishing of charge current to approximate a minimum is informative as to when a battery under charge approaches full charge potential.

2. A battery charger, as claimed in claim 1, in which said gate firing circuit includes a first voltage divider portion having a linear, positive temperature coefficient of resistivity and which connects immediately to said gate, said gate firing circuit additionally including a second voltage divider portion shunt connecting the gate connected end of said first portion to said main circuit between said controlled rectifier and said positive battery post, portions thus compensating for variation in required gate firing potential as caused by variations in temperature of the controlled rectifier.

3. In a battery charger, the combination of a transformer having a primary winding connected to a source of A.C. power and a center tapped, step-down, secondary winding, a main circuit having successively therein from said center tap, a controlled rectifier including a gate, positive and negative battery posts, and a return junction, said main circuit also including an ammeter therein, parallel return circuits, each including a return rectifier to return said charge current alternately each cycle from said return junction to a respective secondary winding extremity, a current limiting resistor, a zener and a first battery current blocking diode successively in a series circuit between the center tap and said return junction and cooperative to establish a reference voltage, a gate firing circuit connecting said series circuit, between said zener and said current limiting resistor, to said gate, said gate firing circuit including a second battery current blocking diode therein facing oppositely of said first blocking diode, said gate firing circuit disposing said reference voltage for comparison with the actual battery voltage in opposing polarity whereby the difference between said voltages is employed to gate fire said controlled rectifier for charge current control whereby the diminishing of charge current to approximate a minimum is informative as to when a battery under charge approaches full charge potential, a base current supplying circuit, a switching transistor with collector connected to said series circuit, with emitter connected to said main circuit, and with base connected to a first voltage divider included by said base circuit and connected to said main circuit between said center tape and said return junction, whereby said switching transistor turns on and off the power establishing said reference voltage by turning on and off the base current.

4. In a battery charger, the combination of a transformer having a primary winding connected to a source of A.C. power and a center tapped, step-down, secondary winding, a main circuit having successively therein from said center tap, a controlled rectifier including a gate, positive and negative battery posts, and a return junction, said main circuit also including an ammeter therein, parallel return circuits, each including a return rectifier to return said charge current alternately each cycle from said return junction to a respective secondary winding extremity, a zener and a current limiting resistor in series between the center tap and said return junction and cooperative to establish a reference voltage, a gate firing circuit connected to dispose said reference voltage for comparison with the actual battery voltage in opposing polarity whereby the difference between said voltages is employed to gate fire said controlled rectifier for charge current control whereby the diminishing of charge current to approximate a minimum is informative as to when a battery under charge approaches full charge potential, a base current supplying circuit, a switching transistor with collector connected to said series circuit, with emitter connected to said main circuit, and with base connected to a first voltage divider included by said base circuit and connected to said main circuit between said center tap and said return junction, whereby said switching transistor turns on and off the power establishing said reference voltage by turning on and off the base current, said base current supplying circuit including a second controlled rectifier and a second gate firing circuit including in series a third blocking diode and a second voltage divider connected to said main circuit across said charger terminals to gate fire said second controlled rectifier only if said battery is of correct nominal voltage for which the battery charger is designed and with polarity properly connected to said charge terminals.

5. In a battery charger, the combination of a transformer having a primary winding connected to a source of A.C. power and a center tapped, step-down, secondary winding, a main circuit having successively therein from said center tap, a controlled rectifier including a gate, positive and negative battery posts, and a return junction, said main circuit also including an ammeter therein, parallel return circuits, each including a return rectifier to return said charge current alternately each cycle from said return junction to a respective secondary winding extremity, a zener and a current limiting resistor in series between the center tap and said return junction and cooperative to establish a reference voltage, a gate firing circuit connected to dispose said reference voltage for comparison with the actual battery voltage in opposing polarity whereby the difference between said voltages is employed to gate fire said controlled rectifier for charge current control whereby the diminishing of charge current to approximate a minimum is informative as to when a battery under charge approaches full charge potential, a base current supplying circuit, a switching transistor with collector connected to said series circuit, with emitter connected to said main circuit, and with base connected to a first voltage divider included by said base circuit and connected to said main circuit between said center tap and said return junction, whereby said switching transistor turns on and off the power establishing said reference voltage by turning on and off the base current, said base current supplying circuit including a second controlled rectifier, a second gate firing circuit including in series a third blocking diode and a second voltage divider connected to said main circuit across said charger terminals to gate fire said second controlled rectifier, said second voltage divider including a thermistor as the gate shunt portion of said second voltage divider to break said base circuit as the battery charger overheats.

6. In a battery charger, the combination of a transformer having a primary winding connected to a source of A.C. power and a center tapped, step-down, secondary winding, a main circuit having successively therein from said center tap, a controlled rectifier including a gate, positive and negative battery posts, and a return junction, said main circuit also including an ammeter therein, parallel return circuits, each including a return rectifier to return said charge current alternately each cycle from said return junction to a respective secondary winding extremity, a zener and a current limiting resistor in series between the center tap and said return junction and cooperative to establish a reference voltage, a gate firing circuit connected to dispose said reference voltage for comparison with the actual battery voltage in opposing polarity whereby the difference between said voltages is employed to gate fire said controlled rectifier for charge current control whereby the diminishing of charge current to approximate a minimum is informative as to when a battery under charge approaches full charge potential, a base current supplying circuit, a switching transistor with collector connected to said series circuit, with emitter connected to said main circuit, and with base connected to a first voltage divider included by said base circuit and connected to said main circuit between said center tap and said return junction, whereby said switching transistor turns on and off the power establishing said reference voltage by turning on and off the base current, said battery charger including a charge current limiting by-pass circuit across said first control rectifier, and a single pole, double throw switch normally closing said base circuit and manually shiftable to close said charge current limiting by-pass circuit, whereby said by-pass circuit may be held closed for periods of predetermined extent in time to test the ability of a battery properly connected to said charger terminals to receive charge, during which periods said base circuit, said gate firing circuit, said series circuit and said main circuit through said first controlled rectifier remain open.

References Cited by the Examiner
UNITED STATES PATENTS

| | | | |
|---|---|---|---|
| 3,009,091 | 11/1961 | Hallidy | 322—28 |
| 3,085,187 | 4/1963 | Godshalk | 320—25 |
| 3,160,805 | 12/1964 | Lawson | 320—39 |

JOHN F. COUCH, *Primary Examiner.*

S. WEINBERG, *Assistant Examiner.*